(12) United States Patent
Marchini et al.

(10) Patent No.: US 10,926,501 B2
(45) Date of Patent: Feb. 23, 2021

(54) METHOD, PROCESS AND APPARATUS FOR BUILDING TYRES FOR VEHICLE WHEELS

(71) Applicant: PIRELLI TYRE S.P.A., Milan (IT)

(72) Inventors: Maurizio Marchini, Milan (IT); Cesare Emanuele Amurri, Milan (IT); Marco Fabbretti, Milan (IT); Andrea Crepaldi, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 473 days.

(21) Appl. No.: 15/535,285

(22) PCT Filed: Nov. 26, 2015

(86) PCT No.: PCT/IB2015/059139
§ 371 (c)(1),
(2) Date: Jun. 12, 2017

(87) PCT Pub. No.: WO2016/097908
PCT Pub. Date: Jun. 23, 2016

(65) Prior Publication Data
US 2018/0264762 A1   Sep. 20, 2018

(30) Foreign Application Priority Data

Dec. 19, 2014 (IT) .............................. MI2014A2198

(51) Int. Cl.
*B29D 30/14* (2006.01)
*B29D 30/16* (2006.01)
(Continued)

(52) U.S. Cl.
CPC ......... *B29D 30/14* (2013.01); *B29D 30/1628* (2013.01); *B29D 30/28* (2013.01); *B29D 30/3028* (2013.01)

(58) Field of Classification Search
CPC ........ B29D 30/28; B29D 30/20; B29D 30/08; B29D 30/06; B29D 30/3028;
(Continued)

(56) References Cited

U.S. PATENT DOCUMENTS 4,001,070 A * 1/1977 Bell ...................... B29D 30/32
156/398
6,013,147 A * 1/2000 Byerley ............... B29D 30/242
156/110.1
(Continued)

FOREIGN PATENT DOCUMENTS

CN   102245372 A   11/2011
CN   102858524 A   1/2013
(Continued)

OTHER PUBLICATIONS

Office Action from the Russian Federation Patent Office dated Apr. 22, 2019, in counterpart Russian Application No. 2017124580/05.
(Continued)

*Primary Examiner* — Robert C Dye
*Assistant Examiner* — Cedrick S Williams
(74) *Attorney, Agent, or Firm* — Finnegan, Henderson, Farabow, Garrett & Dunner, L.L.P.

(57) ABSTRACT

A reinforcement annular structure of a tyre being processed is formed by arranging a forming drum externally carrying a deposition surface; arranging an application member supported in thrust relation toward the deposition surface; longitudinally guiding a continuous elongated element toward a point of application between the deposition surface and a work surface presented by the application member; and winding the continuous elongated element circumferentially around the deposition surface in order to form coils that are axially side-by-side each other. During winding, the work surface of the application member operates in abut-
(Continued)

ment relation against at least one of the cons previously formed by the continuous elongated element.

48 Claims, 11 Drawing Sheets

(51) Int. Cl.
 *B29D 30/28* (2006.01)
 *B29D 30/30* (2006.01)
(58) Field of Classification Search
 CPC .... B29D 30/3078; B29D 30/58; B29D 30/16; B29D 30/24; B29D 30/244; B29D 30/242; B29D 30/1628; B29D 30/1621; B29D 30/14
 See application file for complete search history.

(56) References Cited

U.S. PATENT DOCUMENTS

| | | | |
|---|---|---|---|
| 2008/0251185 A1 | 10/2008 | Cappa et al. | |
| 2009/0188607 A1 | 7/2009 | Tatara et al. | |
| 2011/0315323 A1 | 12/2011 | Lipsa | |
| 2012/0111461 A1 | 5/2012 | Amurri et al. | |
| 2013/0037203 A1* | 2/2013 | Amurri | B29D 30/26 156/110.1 |
| 2013/0206340 A1 | 8/2013 | Tatara et al. | |
| 2016/0075180 A1* | 3/2016 | Kon | B29D 30/08 152/452 |

FOREIGN PATENT DOCUMENTS

| | | | |
|---|---|---|---|
| EP | 1 977 876 | 10/2008 | |
| JP | 3-83631 | 4/1991 | |
| JP | 2014-205462 | 10/2014 | |
| JP | 2014205462 A * | 10/2014 | ........... B60C 9/2204 |
| RU | 2230665 C2 | 6/2004 | |
| SU | 1685749 | 10/1991 | |
| WO | WO 2007/054984 | 5/2007 | |
| WO | WO 2011/007269 | 1/2011 | |
| WO | WO 2011/051798 | 5/2011 | |
| WO | WO 2014/049531 | 4/2014 | |

OTHER PUBLICATIONS

International Search Report from the European Patent Office for International Application No. PCT/IB2015/059139, dated Apr. 21, 2016.
Written Opinion of the International Searching Authority from the European Patent Office for International Application No. PCT/IB2015/059139, dated Apr. 21, 2016.
Notification of the First Office Action from State Intellectual Property Office of the People's Republic of China in counterpart application No. 201580068705.X, dated Dec. 5, 2018 (19 pages, including partial translation).
Written Opinion, dated Feb. 27, 2020, issued by the Brazilian National Institute of Industrial Property in counterpart Application No. BR112017012199 (6 pages).
Notification of the Second Office Action, dated Sep. 25, 2019, issued by the China National Intellectual Property Administration in counterpart Application No. 201580068705.X (20 pages).
Office Action, dated Aug. 6, 2019, issued by the Indonesian Directorate General of Intellectual Property in counterpart Application No. P00201704580 (4 pages).

* cited by examiner

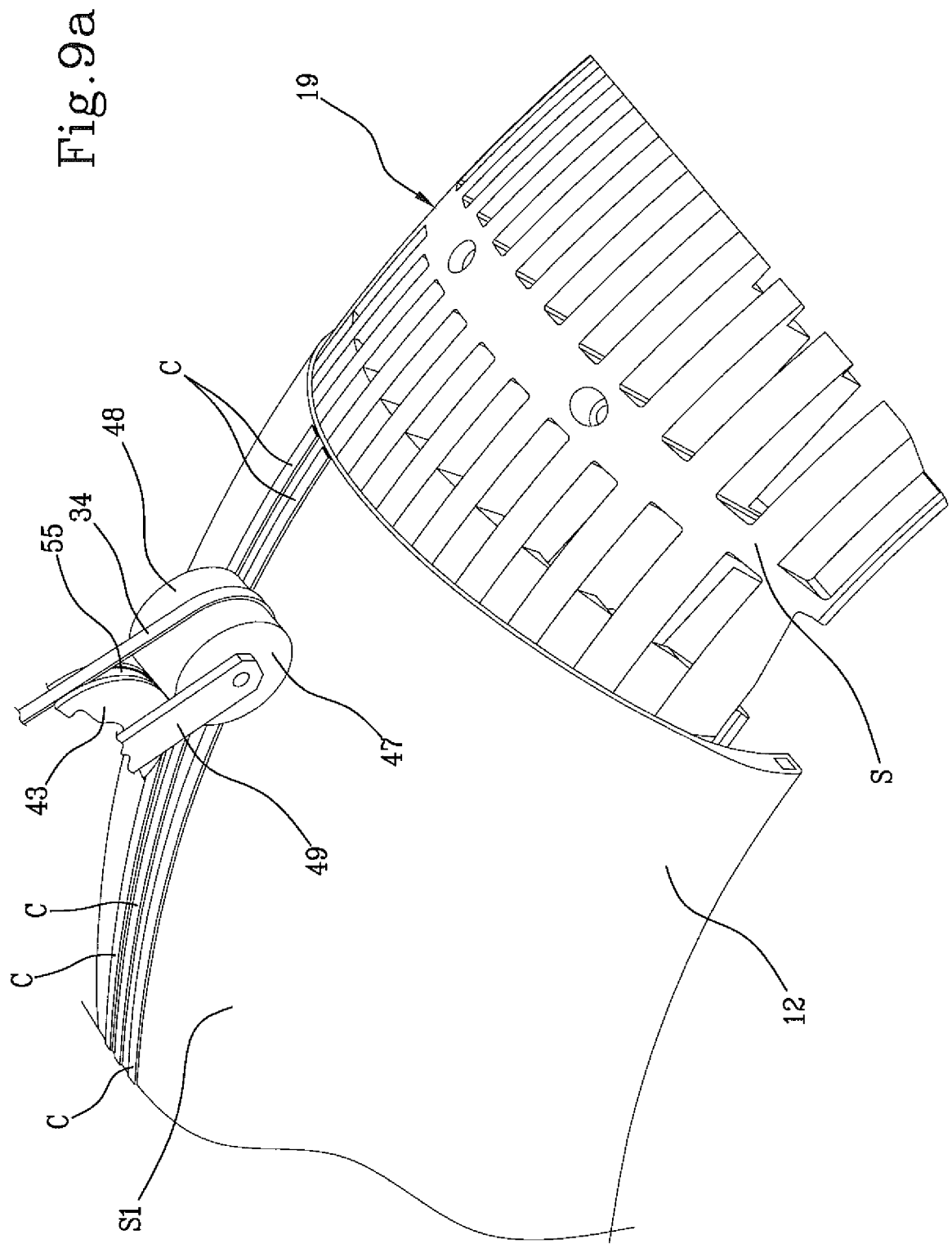

METHOD, PROCESS AND APPARATUS FOR BUILDING TYRES FOR VEHICLE WHEELS

CROSS REFERENCE TO RELATED APPLICATIONS

This application is a national phase application based on PCT/IB2015/059139, filed Nov. 26, 2015, and claims the priority of Italian Patent Application No. MI2014A002198, filed Dec. 19, 2014, the content of both applications being incorporated herein by reference.

BACKGROUND OF THE INVENTION

Field of the Invention

The present invention relates to a method, a process and an apparatus for building tyres for vehicle wheels.

More particularly, the invention is aimed for the building of green tyres, to be subsequently subjected to a vulcanisation cycle for the obtainment of the final product.

Description of Related Art

For the purpose of the present description, with the term "elastomeric material" it is intended to indicate a composition comprising at least one elastomeric polymer and at least one reinforcement filler. Preferably, such composition further comprises additives such as, for example, a cross-linking agent and/or a plasticisation agent. Due to the presence of the cross-linking agent, by means of heating such material can be cross-linked, so as to form the final manufactured product.

By "tyre for two-wheel vehicles", in particular motorcycles, it is intended a tyre whose curvature ratio is approximately comprised between about 0.15 and about 0.45.

By "curvature ratio" relative to a tyre (or to a portion thereof) it is intended the ratio between the distance of the radially external point of the tread band (or of the external surface) from the line passing through the laterally opposite ends of the tread itself (or of the external surface itself), measured on a radial plane of the tyre (or of said portion thereof), and the distance measured along the chord of the tyre (or a portion thereof) between said ends.

By "curvature ratio" relative to a forming drum it is intended the ratio between the distance of the radially external point of the external surface of the drum from the line passing through the laterally opposite ends of the drum itself, measured on a radial plane of the drum, and the distance measured along the chord of the drum between said ends.

The terms "radial" and "axially" and the expressions "radially internal/external" and "axially internal/external" are used with reference to the radial direction of the forming drum used/of the tyre (i.e. to a direction perpendicular to the rotation axis of the aforesaid forming drum/tyre) and to the axial direction of the forming support used/of the tyre (i.e. to a direction parallel to the rotation axis of the aforesaid forming drum/tyre).

The terms "circumferential" and "circumferentially" are instead used with reference to the annular extension of the aforesaid forming support/tyre.

A plane with respect to a forming drum or to a tyre is defined "radial" when it contains the rotation axis of the forming drum or of the tyre, respectively.

By "elementary semi-finished product" it is intended a continuous elongated element made of elastomeric material. Preferably such continuous elongated element can comprise one or more textile and/or metallic cords. Preferably such continuous elongated element can be cut to size.

By "component" or "structural component" of a tyre it is intended any one portion thereof capable of carrying out its own function or a part thereof. For example, components of the tyre include the liner, the under-liner, the sidewall inserts, the bead cores, the filler inserts, the anti-abrasive, the sidewalls, the carcass ply/plies, the belt layer(s), the tread band, the underlayer of the tread band, the under-belt inserts etc.

By "coiling" it is intended, for the purpose of the present description, the action of winding a continuous elongated element according to circumferential coils that are axially side-by-side according to a constant or variable pitch, around a substantially cylindrical or toroidal body.

A tyre for vehicle wheels generally comprises a carcass structure comprising at least one carcass ply having respectively opposite ends engaged with respective annular anchoring structures, integrated in the zones normally identified with the name of "beads", having an internal diameter substantially corresponding with a so-called "fitting diameter" of the tyre on a respective mounting rim.

The carcass structure is associated with a belt structure which can comprise one or more belt layers situated in radial superimposition with respect to each other and with respect to the carcass ply, having textile or metallic reinforcement cords with crossed orientation and/or substantially parallel to the circumferential extension direction of the tyre (at 0 degrees). In radially external position with respect to the belt structure, a tread band is applied, it too made of elastomeric material like other components constituting the tyre.

Respective sidewalls made of elastomeric material are also applied in axially external position on the lateral surfaces of the carcass structure, each extended from one of the lateral edges of the tread band up to the respective annular anchoring structure to the beads. In the tyres of "tubeless" type, an air-impermeable covering layer, normally termed "liner", covers the internal surfaces of the tyre.

Following the building of the green tyre, actuated by means of the assembly of respective components, a moulding and vulcanisation treatment is generally executed, aimed to determine the structural stabilisation of the tyre by means of cross-linking of the elastomeric compositions as well as to impart on the same, if requested, a desired tread pattern and possible distinctive graphic marks at the sidewalls of the tyre.

In many cases, the belt structure comprises, as described above, at least one reinforcement annular structure so-called "zero degree layer". The zero degree layer is normally formed by at least one continuous elongated element, comprising one or more textile or metallic material cords that are parallel and adjacent to each other and incorporated in an elastomeric matrix, wound circumferentially around the rotation axis of the tyre according to a plurality of coils that are mutually side-by-side along a substantially axial direction.

WO-2007054984-A1 on behalf of the Applicant shows a reinforcement structure of a tyre being processed, e.g. the zero degree layer of the belt structure, obtained by means of equipment comprising at least one carriage carrying devices for guiding a continuous elongated element towards a forming drum, devices for applying the elongated element against a deposition surface of the drum, and units for shearing the continuous elongated element upon completed application. The forming drum is rotated around its axis, so as to determine the circumferential winding of the continuous elongated element. A simultaneous movement of the carriage determines the winding of each continuous elongated element according to coils that are axially side-by-side on the deposition surface, in order to achieve a respective portion of the zero degree layer, according to a desired axial extension on underlying belt layers carried by the forming drum.

WO-2011051798-A1 on behalf of the Applicant provides for obtaining, on a forming support, a belt structure comprising a reinforcement structure of so-called zero degree type. The reinforcement structure is made by depositing a continuous elongated reinforcement element on a deposition surface situated in radially external position with respect to the forming support. The aforesaid deposition comprises the step of exerting, by means of an element made of magnetic material, a magnetic attraction on a portion of the continuous elongated reinforcement element, arranged at at least one pressure element and moving said at least one pressure element towards the forming support until the continuous elongated reinforcement element is brought into contact with the deposition surface. The continuous elongated reinforcement element is then pressed by the pressure element against the deposition surface while the forming support is rotated. The continuous elongated reinforcement element is deposited according to adjacent coils perpendicular to the rotation axis of the forming support.

WO-2014049531-A1 on behalf of the Applicant, describes a method for controlling the manufacturing of reinforcement structures of tyres for vehicle wheels. Said method comprises: exerting, on a head portion of a continuous elongated reinforced element, an attractive force towards a forming support; depositing the elongated element on the forming support with a predetermined tensioning force in order to form a coiled winding; depositing at least one reinforcement layer in a radially external portion with respect to the coiled winding, in order to form a reinforcement structure in which mutual forces operate between the coiled winding and the reinforcement layer; separating the reinforcement structure from the forming support by means of a radial contraction thereof.

SUMMARY OF THE INVENTION

The Applicant has observed that the known devices, as described for example in WO-2007054984-A1, WO-2011051798-A1 and WO-2014049531—are particularly conceived for meeting the production needs in the scope of production processes in which the carcass structure, generally in sleeve form, and the belt structure are made separately from each other in respective production lines, in order to be mutually assembled at a later time.

The Applicant has additionally observed that by making the belt structure and possibly other components directly on the carcass sleeve, already shaped according to the desired configuration thereof in the built green tyre, it is possible to attain various advantages including a greater geometric and structural precision of the single components, and an optimal positioning of each of these with respect to other components of the tyre being processed.

For such purpose, the Applicant is developing new production processes which provide for the use of a radially expandable forming drum, arranged to be internally coupled to the carcass structure shaped according to a toroidal configuration, in order to suitably support it during the formation of the belt structure and other components required for the building of the tyre.

More particularly, the Applicant has observed that it is advantageous to use a forming drum composed of circumferential sectors which, in a radially expanded condition, define an external abutment surface having solid portions alternated with cavities, for example defined by the empty spaces existing between contiguous sectors.

The Applicant has nevertheless perceived that devices made according to the prior art, as described for example in WO-2007054984-A1, WO-2011051798-A1 and WO-2014049531 may be poorly suitable for executing operations of deposition for winding axially side-by-side and/or radially superimposed coils of continuous elongated elements on forming drums having surface discontinuities.

The Applicant in fact deems that a correct deposition of the continuous elongated element, especially when the deposition surface has a profile with accentuated transverse curvature, requires the application of thrust actions transmitted, e.g. by means of rollers or other applicator members, on the same continuous elongated element in the direction of the toroidal support. According to the intuition of the Applicant, in this circumstance the presence of the surface discontinuities determined by the cavities on the abutment surface could cause sudden and uncontrolled variations of the stresses transmitted to the elementary semifinished product during the application, with consequent risk of deformation, damage or breakage of the elementary semifinished products themselves in deposition phase. The roller or other application member thrust towards the toroidal support would in fact tend to "sink" in the cavities progressively encountered on the toroidal support during the application, generating, due to consequent impact and bouncing, strong vibrations which would compromise the regular application of the continuous elongated element.

The Applicant has perceived that the coils laid on the drum, in the sections extended as a bridge between two contiguous solid portions, are adapted to offer a certain resistance to the thrust exerted by the roller or other application member. This is more evident with the use of cords made of metallic material.

The Applicant has finally found that by exploiting the presence of the coils already deposited on the drum as support base for the roller or other application member, the effect of the discontinuities encountered by the roller itself along the circumferential extension of the deposition surface is significantly attenuated, during the deposition of the aforesaid continuous elongated element on said forming drum.

More particularly, in accordance with a first aspect, a method for building tyres for vehicle wheels forms the object of the present invention.

Preferably, a reinforcement annular structure of a tyre being processed is formed by means of deposition of at least one continuous elongated element circumferentially around a deposition surface externally carried by a forming drum, to form circumferential coils that are axially side-by-side each other.

Preferably the deposition is executed by means of an application member supported in thrust relation towards said deposition surface.

Preferably, the application member is configured to operate against at least one coil previously formed by the continuous elongated element during the forming of at least one part of the reinforcement annular structure.

In accordance with a second aspect, the invention relates to a process for building tyres for vehicle wheels.

Preferably, provision is made for forming at least one reinforcement annular structure of a tyre being processed.

Preferably a forming drum is arranged, externally carrying a deposition surface.

Preferably an application member is arranged, supported in thrust relation towards the deposition surface.

Preferably a continuous elongated element is longitudinally guided towards a point of application between the deposition surface and a work surface presented by the application member.

Preferably the continuous elongated element is circumferentially wound around the deposition surface in order to form circumferential coils that are axially side-by-side and at a predetermined distance from each other.

Preferably, during winding, the work surface of the application member is configured for operating in abutment relation against at least one of the coils previously formed by the continuous elongated element, during the forming of at least one part of the reinforcement annular structure.

In accordance with a further aspect, an apparatus for building tyres for vehicle wheels forms the object of the invention.

Preferably, provision is made for a forming drum counter-shaped with respect to a tyre being processed.

Preferably, provision is made for deposition devices in order to form at least one reinforcement annular structure of said tyre.

Preferably, said deposition devices comprise an application member configured for operating in thrust relation towards said deposition surface.

Preferably, said deposition devices comprise a supply group for supplying at least one continuous elongated element towards a point of application between a deposition surface carried by the forming drum and a work surface presented by the application member.

Preferably, provision is made for a coiling unit for winding the continuous elongated element circumferentially around the deposition surface of the forming drum, to form circumferential coils that are axially side-by-side and at a predetermined distance from each other.

Preferably, a work surface of the application member has an axial size greater than the distance existing between two contiguous coils formed by the continuous elongated element wound around the deposition surface.

The Applicant deems that if during the execution of the coiling of the continuous elongated element the application roller is arranged to operate in abutment relation against at least one of the previously-laid coils, at least when the application roller itself and/or the continuous elongated element tend to penetrate into one of the cavities present in the forming drum, the vibrations induced by the discontinuities present on the external surface of the forming drum are substantially eliminated.

Thus, high precision is ensured in the deposition of the single coils of the continuous elongated element, in order to have a qualitatively excellent production.

It is also possible to deposit the continuous elongated element at a greater speed, increasing productivity without compromising the quality of the processing.

In at least one of the aforesaid aspects, the invention comprises one or more of the following preferred characteristics, which are described hereinbelow.

Preferably, the action of the application member against said at least one previously formed coil is verified following a radial movement of the application member towards the forming drum.

Said radial movement of the application member can for example occur due to an at least partial penetration of the continuous elongated element and/or of the application member in a cavity presented by the forming drum in proximity to the deposition surface.

Preferably, a work surface of the application member, configured for operating against the continuous elongated element, has an axial size greater than an interaxis existing between two axially contiguous coils.

Thus, a reliable abutment is ensured of the application member against at least one of the previously-laid coils.

Preferably, said application member operates on the continuous elongated element radially interposed between said application member and the deposition surface.

Preferably, the forming drum has cavities alternated with solid portions at said deposition surface.

Preferably, said cavities each have axial size greater than an interaxis existing between two axially contiguous coils formed by the continuous elongated element.

Preferably, the continuous elongated element wound around the deposition surface at least partially opposes the thrust action exerted by the application member at at least one of said cavities.

Preferably, the work surface of the application member has an axial size greater than the axial size of the cavities.

In this manner, it is assured that the application member abuts against at least one of the solid portions that delimit the cavity, in order to better ensure the stability of the application member itself.

Preferably, the work surface of the application member is substantially continuous in an axial direction.

Preferably, during winding, the work surface of the application member is maintained substantially parallel to the deposition surface of the forming drum at a point of application of the continuous elongated element.

It is thus possible to ensure a correct application of the elongated element along the entire profile of the deposition surface, even when the latter has a high transverse curvature ratio.

Preferably, the work surface of the application member substantially parallel to the deposition surface of the forming drum is maintained by means of an action of control of a mutual orientation between the forming drum and the application member.

Preferably, the action of winding said continuous elongated element comprises: rotating the forming drum around a geometric rotation axis thereof, in order to cause the winding of the continuous elongated element according to circumferential coils; actuating controlled relative movements between the forming drum and the application member, during the rotation of the forming drum in order to distribute the coils in a mutually axially approached relationship.

The movement of the single forming drum in order to distribute the continuous elongated element on the deposition surface also simplifies the execution of the coiling on drums having shape and size that are different each time, and/or a curvature profile accentuated at the deposition surface, as typically occurs, for example, in making tyres for motor vehicles.

Preferably, a pointing action is also provided for positioning an end section of the continuous elongated element on the deposition surface, before starting the winding action.

The pointing operation ensures a stable connection between the continuous elongated element and the deposition surface, so that the continuous elongated element can be effectively driven due to the rotation imparted to the forming drum, for the purpose of the subsequent coiling.

Preferably, the pointing action comprises: longitudinally moving the continuous elongated element until a terminal section thereof is brought to tangentially project beyond a pointing wheel; bending the terminal section according to a curved extension around the pointing wheel; moving the pointing wheel towards the forming drum in order to bring said terminal section in thrust relation against the deposition surface; disengaging the terminal section from the pointing wheel.

Preferably, the pointing action is followed by: moving the pointing wheel away from the forming drum; positioning the application member against the continuous elongated element at said point of application.

Thus, an effective engagement of the terminal section of the continuous elongated element is obtained on the deposition surface, without the risk of causing undesired interference between the forming drum and the continuous elongated element.

Preferably, during said longitudinal movement, the terminal section of the continuous elongated element is inserted between the application member and the pointing wheel.

Preferably, the action of bending the terminal section is executed by translating the application member according to a curved path around the pointing wheel.

The application member is therefore also suitable for being used for executing the pointing action, without requiring the aid of additional components.

Preferably, the moving of the pointing wheel away from the forming drum occurs according to a distance less than the diameter of the application roller.

It is therefore possible to bring the application roller against the deposition surface by simply moving the application roller itself around the rotation axis of the pointing wheel.

Preferably, the disengagement of the terminal section from the pointing wheel occurs by means of angular movement of the application member beyond the terminal section.

Preferably, said application member comprises an application roller that is rotatable according to an axis substantially coplanar with a geometric rotation axis of the forming drum.

Preferably, during winding, a rotation axis of the application roller is maintained substantially parallel to a direction tangent to the deposition surface at a point of application of the continuous elongated element.

Preferably, by means of an action of control of a mutual orientation between the forming drum and the application roller, a rotation axis of the application roller is maintained substantially parallel to a direction tangent to the deposition surface at a point of application of the continuous elongated element.

It is therefore advantageously possible to maintain the work surface of the application roller according to a correct orientation with respect to the deposition surface, even when the latter has a curvilinear profile whose orientation progressively changes along an axial direction.

Preferably, during winding, the application roller is rotated by the continuous elongated element applied on the deposition surface.

The continuous elongated element is therefore suitable for being supplied according to an advancement speed coinciding with the peripheral speed of the deposition surface at the point of application. Variations of said peripheral speed, for example due to variations of circumference of the deposition surface at different axial positions of the transverse profile thereof, are automatically counterbalanced.

Preferably, during winding, a control of the axial positioning of the continuous elongated element on the application roller is actuated.

Preferably, the control of the axial positioning of the continuous elongated element occurs by means of engagement of the latter through a transit opening defined between the pointing wheel and a containment counter-roller operatively engaged on the pointing wheel.

Thus, a precise positioning of the continuous elongated element on the deposition surface, during the execution of coiling, is constantly ensured.

Preferably, said deposition surface has a curvilinear profile cross section.

It is thus possible to execute the processing of dedicated motor vehicle tyres.

Preferably, said deposition surface has a curvilinear profile cross section according to a curvature ratio comprised between about 0.15 and about 0.45.

Preferably, said deposition surface comprises at least one carcass sleeve externally applied to the forming drum.

It is therefore possible to make the reinforcement structure in belt layer form, directly on the carcass sleeve. The stickiness of the raw elastomeric material employed in making the carcass sleeve facilitates a stable application of the continuous elongated element. It may also be possible to eliminate the need for arranging, on the forming drum, additional elastomeric layers before executing the coiling in order to facilitate the adhesion of the continuous elongated element.

Preferably, the action of applying a carcass sleeve around the forming drum, before the deposition of the continuous elongated element, is also provided.

Preferably, applying the carcass sleeve comprises: arranging the carcass sleeve around the forming drum arranged in a radially contracted condition; expanding the forming drum inside the carcass sleeve during a shaping action thereof, according to a toroidal configuration.

At the end of the shaping, the carcass sleeve is therefore already arranged on the forming drum for the purpose of making a crown structure and/or other structural components of the tyre being processed.

The Applicant deems that making the crown structure on the carcass sleeve shaped according to a precise predefined profile, set by the geometric configuration of the forming drum, causes greater structural precision of the single components of the crown structure and of the positioning thereof with respect to the other constituent elements of the tyre.

With the elimination of the need to couple the carcass sleeve to the belt structure and/or other separately-made components, problems of process precision and repeatability are also overcome, typically correlated to the need to couple separately-made structural components. A simplification of the production plants is also attained, since it is no longer required to execute additional operations and relative machinery in order to cause the transfer of the belt structure and/or other geometrically unstable components from the locations where they are built to the location where they must be coupled with the carcass sleeve itself.

Also eliminated is the execution of additional operations, and relative machinery and materials, required for the production and management of auxiliary components, such as sheets and the like, which can prove useful or necessary for simultaneously stabilizing the positioning of the different parts of the belt structure on a different auxiliary drum.

Preferably, said coiling unit comprises devices for rotating the forming drum around its geometric axis and conferring relative axial distribution movements between the forming drum and the supply group.

Preferably, the work surface of the application member has an axial size at least equal to three times the axial size of the continuous elongated element applied on the deposition surface.

Preferably, the work surface of the application member has an axial size greater than 10 mm.

Preferably, the forming drum has cavities alternated with solid portions at said deposition surface.

Preferably, said cavities and solid portions are distributed according to mutually adjacent circumferential rows.

Preferably, the work surface of the application member has an axial size greater than the axial size of the cavities.

Preferably, said application member comprises an application roller that is rotatable according to an axis substantially coplanar with a geometric rotation axis of the forming drum.

Guided devices are also preferably provided, operating in proximity to the application member in order to control the axial positioning of the continuous elongated element with respect to the point of application.

Preferably, said guide devices comprise a transit opening having an axial positioning that is fixed with respect to the application member.

Preferably, said transit opening is counter-shaped with respect to a cross section profile of the continuous elongated element.

Preferably, said transit opening is defined between a pointing wheel and a containment counter-roller operating tangentially against an external circumferential surface of the pointing wheel.

Preferably, said transit opening is defined by at least one circumferential guide groove defined along a radially external surface of at least one of said pointing wheel and containment counter-roller.

Preferably, the application member is movable around a pointing wheel rotatably carried by a support structure.

Thrust devices are also provided, operating between said support structure and a fixed structure.

The thrust action directly exerted on the application member allows a considerable containment of the masses subjected to possible accelerations, and hence of the transmitted forces, following possible discontinuities encountered by the application member, during winding of the continuous elongated element on the deposition surface.

Control devices are also provided, operating on the application member in order to selectively translate it between a feed position in which it defines, with said pointing wheel, an inlet opening aligned with a direction of advancement of the continuous elongated element coming from the supply group, and a disengagement position in which it is angularly shifted with respect to the feed position.

Preferably, in the disengagement position, the application member is angularly shifted with respect to the feed position according to an angle comprised between 160° and 200°.

Preferably, said control devices further translate the application member into a pointing position interposed between the feed position and the disengagement position.

Preferably, said control devices further translate the application member into at least one work condition in which the application member itself operates between the feed position and the disengagement position, in thrust relation towards the deposition surface.

Preferably, the containment counter-roller is selectively translatable between an operative position in which it operates against the pointing wheel and a rest position in which it is moved away from the pointing wheel.

Preferably, in the rest condition the containment counter-roller frees the access for the application member towards the respective feed position.

Preferably, the pointing wheel is movable towards the forming drum in order to bring the continuous elongated element against the deposition surface.

Preferably, said coiling devices comprise an anthropomorphic robotic arm. The use of a robotic arm allows conferring to the forming drum all the movements required for the correct distribution of the continuous elongated element on the deposition surface. It is also possible to opportunely adapt the movement of the drum to the execution of the coiling according to different and specific design needs, on drums of different shapes and sizes.

Preferably, provision is also made for the following: a shaping station for applying a carcass sleeve on the forming drum; devices for transferring the forming drum from the shaping station to said application member.

Preferably, said shaping station comprises: devices for arranging the carcass sleeve around the forming drum arranged in a radially contracted condition; devices for conforming the carcass sleeve according to a toroidal configuration; devices for expanding the forming drum inside the carcass sleeve shaped.

Preferably, the forming drum comprises circumferentially consecutive sectors that are radially movable between a contracted condition in which said sectors are moved close with respect to a geometric rotation axis of the forming drum, and an expanded condition in which the sectors are radially moved away from said geometric rotation axis in order to define a radially external abutment surface.

Further characteristics and advantages will be clearer from the detailed description of a preferred but not exclusive embodiment of a method for building tyres for vehicles, a process for building said tyres actuatable by means of the aforesaid method, and an apparatus for building tyres for vehicle wheels, in accordance with the present invention.

BRIEF DESCRIPTION OF THE DRAWINGS

Such description will be set forth hereinbelow with reference to the enclosed drawings, provided only as a non-limiting example, in which:

FIG. 9a schematically shows a perspective view of the application roller during the deposition of the continuous elongated element on the deposition surface carried by the forming drum;

DETAILED DESCRIPTION OF THE INVENTION

Figure 1:
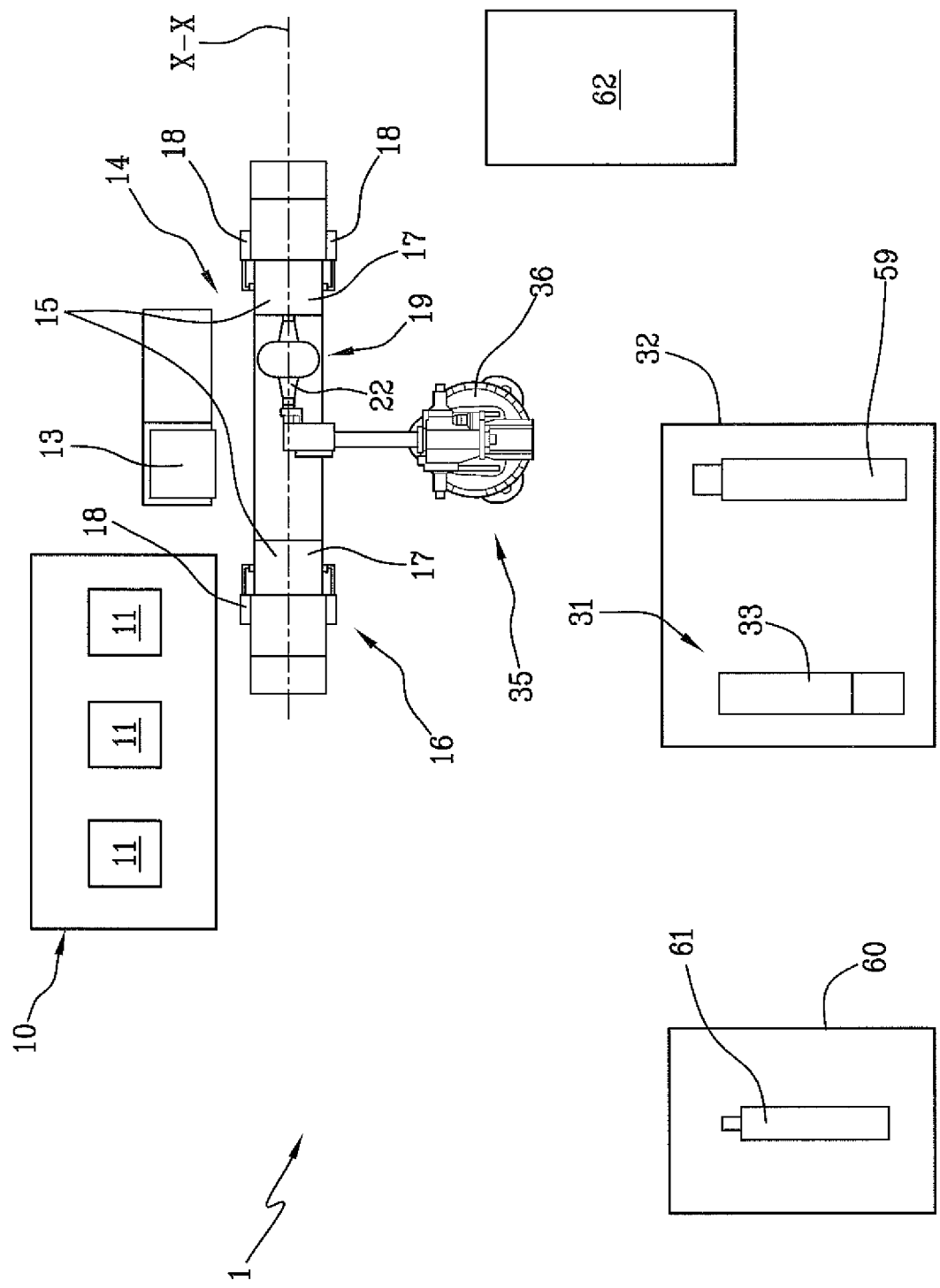
FIG. 1 schematically shows a top view of a plant for building tyres.
Figure 2:
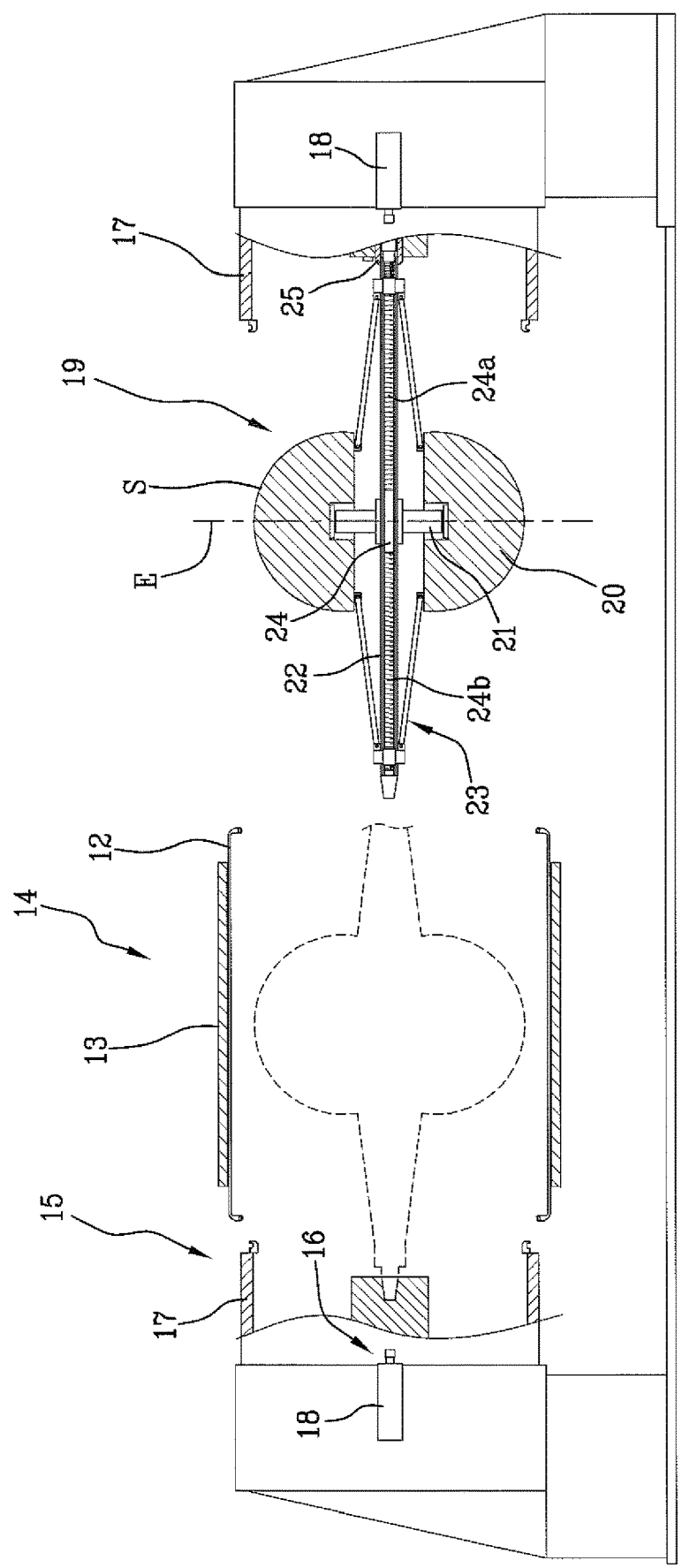
FIG. 2 schematically shows, in side and partial section view, the loading of a carcass sleeve on a shaping station.
Figure 3:
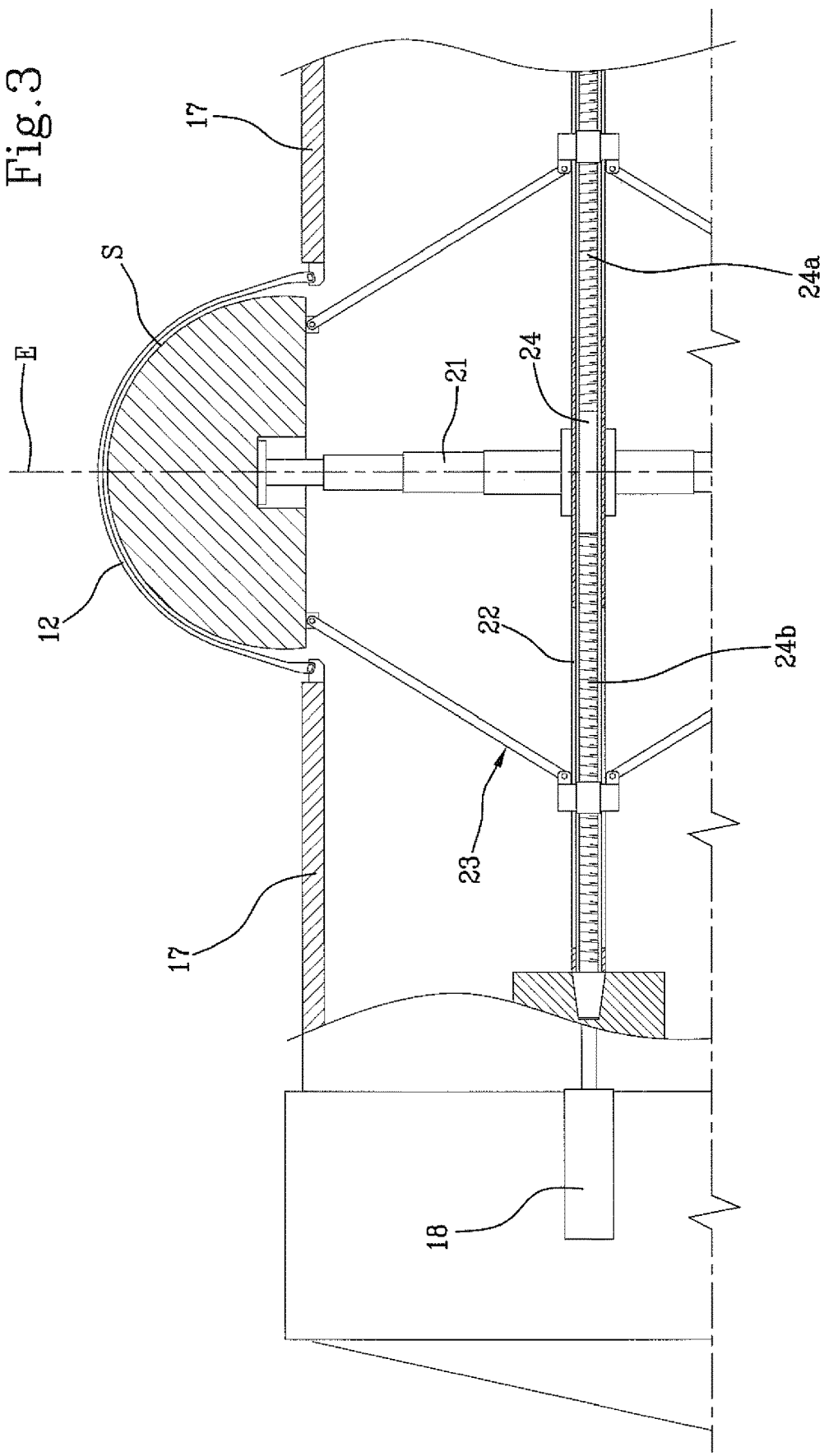
FIG. 3 schematically shows, in side and partial section view, the execution of the shaping of the carcass sleeve.

With reference to the abovementioned figures, reference number 1 overall indicates a plant for building tyres for vehicle wheels. The plant 1 is arranged according to a new building method in order to actuate a process for building tyres for vehicle wheels, according to the present invention.

The plant 1 is set for manufacturing tyres 2 (FIG. 10) essentially comprising at least one carcass ply 3 preferably internally covered by a layer of impermeable elastomeric material or so-called liner 4. Two annular anchoring structures 5, each comprising a so-called bead core 5a preferably carrying an elastomeric filler 5b in radially external position, are engaged at respective end flaps 3a of the carcass ply/plies 3. The annular anchoring structures 5 are integrated in proximity to zones normally identified with the term "beads" 6, at which the engagement between the tyre 2 and a respective mounting rim (not depicted) normally occurs.

A belt structure 7 is circumferentially applied around the carcass ply/plies 3, and a tread band 8 is circumferentially superimposed on the belt structure 7. Two sidewalls 9, each extended from the corresponding bead 6 to a corresponding lateral edge of the tread band 8, are applied in laterally opposite positions on the carcass ply/plies 3.

The plant 1 comprises a carcass building line 10 having one or more building locations 11 where the manufacturing of a carcass sleeve 12, having substantially cylindrical shape, is executed for example according to known modes. The carcass sleeve 12 comprises said at least one carcass ply 3, preferably internally covered by the liner 4, and having respective axially opposite edges end flaps 3a engaged, for example by turning up, with the respective annular anchoring structures 5. If necessary, the carcass sleeve 12 can also comprise the sidewalls 9 or first portions thereof, each extended starting from a respective bead 6.

A handling device 13 provides for the transfer of the carcass sleeve 12 from the carcass building line 10 to a shaping station 14 comprising devices 15 for engaging the carcass sleeve 12 and shaping devices 16, upon whose action the carcass sleeve 12 is shaped according to a toroidal configuration.

The engagement devices 15 for example comprise a pair of flange elements 15a coaxially facing each other, each operatively engageable at one of the annular anchoring structures 5 respectively carried by the axially opposite ends of the carcass sleeve 12.

The shaping devices 16 can comprise one or more linear actuators or other axial movement devices 18, operating on one or preferably both flange elements 17 in order to move them axially towards each other starting from the aforesaid work condition. The mutual approaching of the flange elements 17 causes a mutual approaching of the annular anchoring structures 5 so as to allow the shaping of the carcass sleeve 12 according to a toroidal configuration, preferably assisted by the simultaneous introduction of air or other pressurized operating fluid in the carcass sleeve 12.

In the shaping station 14, the shaped carcass sleeve 12 is coupled to a toroidal forming drum 19, substantially rigid and radially expandable, arranged inside the carcass sleeve 12 itself.

In FIGS. 1 to 3 and 6 to 8, the forming drum 19 is only schematically displayed.

The forming drum 19 comprises a plurality of sectors 20 circumferentially distributed around a geometric rotation axis X-X of the forming drum 19 itself. Provision can be made such that the sectors 20 are carried by respective telescopically extendable guide members 21, radially extended from a central shaft 22 coaxial with the geometric rotation axis X-X. The sectors 20 are movable from a contracted condition in which they are moved close to the central shaft 22, to an expanded condition in which said sectors 20 are moved away from the central shaft 22.

Preferably, the contracted condition and the expanded condition of the sectors 20 respectively correspond with a condition of maximum radial contraction and a condition of maximum radial expansion of the forming drum 19.

The movement of the sectors 20 can be attained by means of transmission mechanisms 23 operatively connected to two threads 24a, 24b, respectively right-hand and left-hand, situated at axially opposite positions along a threaded bar 24, coaxially engaged in the central shaft 22 and drivable in rotation for example by means of a rotary driver 25 arranged in the shaping station 14.

In the expanded condition, the set of the sectors 20 defines, along its circumferential extension, a radially external abutment surface "S", toroidally shaped according to the internal configuration that at least one part of the carcass sleeve 12 assumes upon completed shaping. Provision can be advantageously made such that the abutment surface "S" of the forming drum 19 in the expanded condition has a curvature ratio comprised between about 0.15 and about 0.45, typically adapted for making tyres for motorcycles or other two-wheel vehicles. If necessary, curvature ratios can nevertheless be used with lower values than those indicated above, for example adapted for the production of car or truck tyres.

Figure 4:
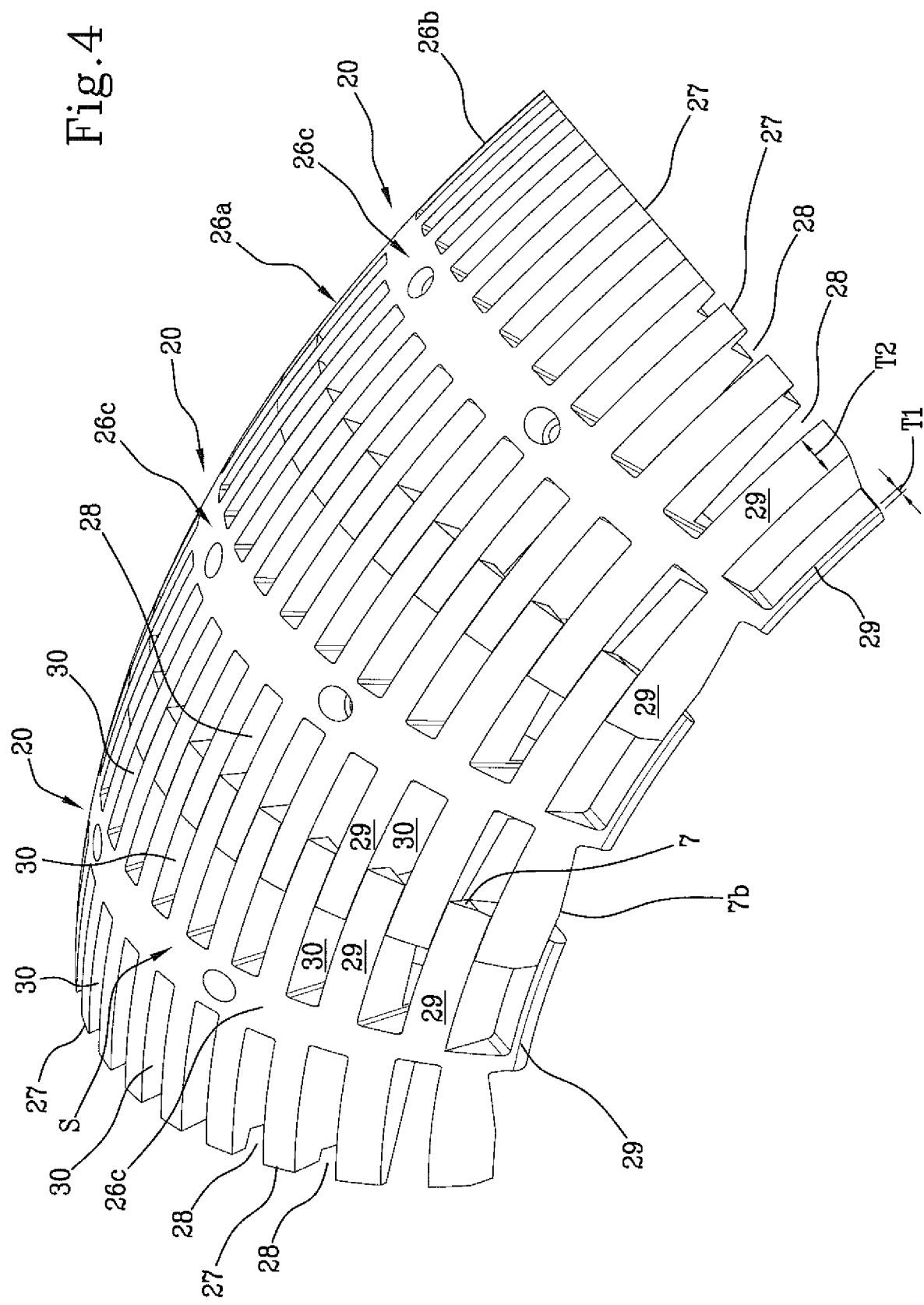
FIG. 4 shows a perspective view of several sectors of a forming drum in an expanded condition.

As is better illustrated in FIG. 4, each of the sectors 20 has circumferentially opposite coupling portions 26a, 26b, mutually interconnected by means of an intermediate portion 26c which has, at least on the abutment surface "S", a main extension direction parallel to a radial plane of the forming drum 19. Each of the coupling portions 26a, 26b has a plurality of elongated projections 27 extended in a circumferential direction from the intermediate portion 26c, alternated with respective circumferentially elongated cavities 28.

In a same sector 24, the projections 27 belonging to one of the coupling portions, for example 26a, are offset with respect to the projections 27 of the other coupling portion 26b.

The projections 27 of each sector 24 are suitable for sliding in the respective cavities 28 of the circumferentially adjacent sectors 20 in order to support the expansion and contraction movements of the forming drum 19. In the contracted condition, the projections 27 of each sector 24 penetrate into the respective cavities 28 until they touch or nearly touch the intermediate portion 26c of the adjacent sector 24. In the expanded condition, the projections 27 are extracted from the cavities 28 to an extent at least equal to 80% of the length thereof.

The presence of the projections 27, of the cavities 28 and their mutual relation ensure that, on the abutment surface "S", circumferential rows of solid portions 29 are identifiable, at least in the expanded condition; such solid portions 29 are defined by the projections 27 and are alternated with empty portions 30 defined by the cavities 28. The solid portions 29 and empty portions 30 belonging to each circumferential row are circumferentially offset with respect to the solid portions 29 and empty portions 30, respectively, of axially adjacent circumferential rows.

Preferably, at least in proximity to an axial centreline plane "E" of the forming drum 19, still more preferably over all the projections 27 except those situated along the axially opposite circumferential edges of the forming drum 19, each projection 27 has axial size approximately comprised between about 4 mm and about 15 mm, preferably equal to about 8 mm. Each cavity 28 has preferably axial size "n" equal to that of the projections 27 circumferentially aligned therewith.

Provision is also preferably made such that the empty portions 30 in the expanded condition have a circumferential size comprised between about 30 mm and about 60 mm, preferably equal to about 40 mm.

The axial size of the projections 27 and cavities 28 at the axially opposite circumferential edges of the abutment surface "S" can be different with respect to those detectable in the remaining axially more internal portions of the forming drum 19. In a preferred embodiment, the circumferential rows of solid portions 29 defining axially opposite circumferential edges of the abutment surface "S", or arranged in proximity thereto, have a transverse size less than a transverse size presented by the circumferential rows of solid portions 29 arranged in proximity to an axial centreline plane of the abutment surface "S". Such transverse size is measured along the profile of the abutment surface "S", in a radial plane of the forming drum 19.

The forming drum 19, arranged in the shaping station 14 in contracted condition, is circumscribed by the carcass sleeve 12 simultaneously with the engagement of the latter in the shaping station 14 itself.

When the carcass sleeve 12 starts to be radially expanded for shaping purposes, the radial expansion of the forming drum 19 at its interior is driven. Thus the coupling is enabled between carcass sleeve 12 and forming drum 19, carrying an internal surface of the carcass sleeve 12 in contact relation against the abutment surface "S" of the forming drum 19. Upon completed coupling, the flange elements 17 disengage the carcass sleeve 12, leaving it on the forming drum 19.

Carcass sleeve 12 and forming drum 19 in mutual coupling relation are adapted to be subjected to the action of deposition devices 31, arranged to form at least one reinforcement annular structure of the tyre 2 being processed on a deposition surface "S1" presented by the carcass sleeve itself, in radially external position with respect to the abutment surface "S". More particularly, the deposition devices 31 are preferably installed in a belt structure application station, preferably remote with respect to said shaping station 14, and are adapted to make said at least one belt layer 7a on the deposition surface "S1".

The deposition devices 31 comprise a supply group 33 for supplying at least one continuous elongated element 34, for example composed of a rubber-covered metallic or textile cord. In a preferred embodiment, the continuous elongated element 34 comprises a plurality of metallic or textile cords 34a that are mutually parallel and coplanar, for example two to five cords at least partially covered by an elastomeric matrix.

Figure 9:
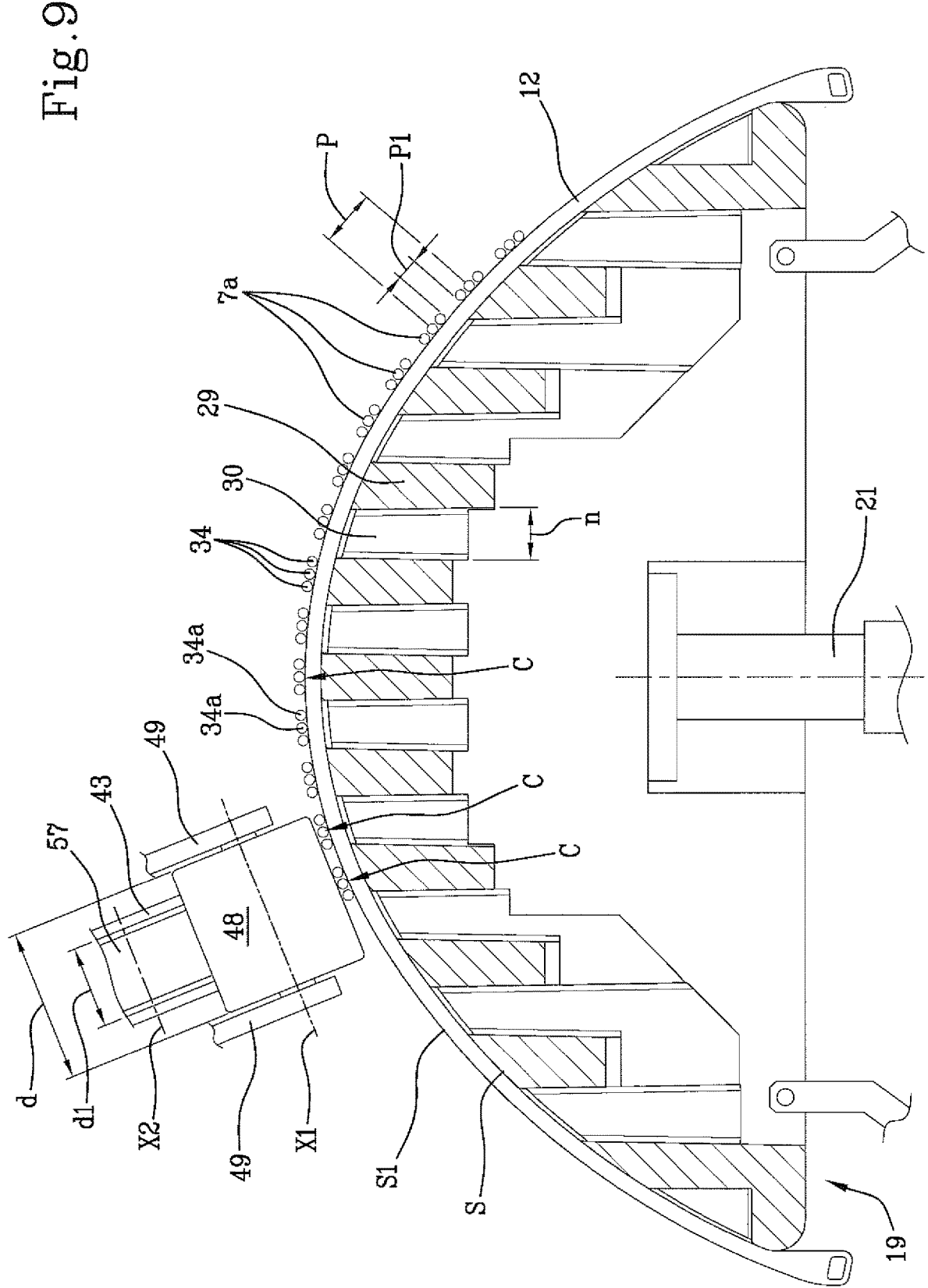
FIG. 9 schematically shows an application roller in thrust relation against the deposition surface carried by the forming drum, represented in radial section.

At least one coiling unit 35 cooperates with the supply group 33 such that the continuous elongated element 34 delivered by the supply group itself is wound circumferentially around the deposition surface "S1" carried by the forming drum 19, to form circumferential coils "C" that are axially side-by-side each other. In FIG. 9, "p1" indicates a mutual distance between two coils "C", mutually side-by-side on the deposition surface "S1".

Preferably, the coiling unit 35 comprises at least one anthropomorphic robotic arm 36, preferably with six or more oscillation axes, or another type of coiling devices configured for rotating the forming drum 19 around its geometric axis X-X and conferring relative axial distribution movements between the forming drum itself and the supply group 33.

The robotic arm 36 engages the forming drum 19, for example at one of the ends of the central shaft 25, and transfers it from the shaping station 14 to the belt structure application station 32.

The supply group 33 comprises a support structure 37 carrying at least one idle pulley 38 or another suitable guide element. Preferably, the support structure 37 is translatable upon command of at least one thrust actuator 39 carried by a fixed structure 40, or analogous thrust devices.

The pulley 38 is adapted to operatively engage the continuous elongated element 34 coming for example from a reel or another feed unit, not illustrated, in order to guide it towards a cutting unit 41 carried by the support structure 37. The cutting unit 41, not illustrated in detail since can be made in a known manner, can for example comprise a fixed cutter and a movable cutter, drivable by a cutting actuator 42 in order to cut the continuous elongated element 34, extended between the fixed cutter and the movable cutter.

Downstream of the cutting unit 41, with reference to a direction of advancement of the continuous elongated element 34, a pointing wheel 43 operates, rotatably supported by the support structure 37. The pointing wheel 43 tangentially engages the continuous elongated element 34, cooperating with the pulley 38 in order to guide it according to a rectilinear path through the cutting unit 41.

Between the pulley 38 and the cutting unit 41, i.e. upstream of the latter, a feed group operates, comprising for example a fixed gripper 44a and a movable gripper 44b aligned along the direction of advancement of the continuous elongated element 34 that traverses them. The fixed gripper 44a is integral with respect to the support structure 37, while the movable gripper 44b can be alternately translated upon command of a feeding actuator 45. Each of the grippers 44a, 44b is selectively switchable between a grip condition, in which it exerts a retention action on the continuous elongated element 34, and a release condition in which the continuous elongated element 34 is free to slide through the gripper itself. The movable gripper 44b is switched into closure condition during the outgoing travels towards the cutting unit 41 of its own alternating movement. The fixed gripper 44a is in turn switched into the closure condition during the return travels of the movable gripper 44b, in moving away from the cutting unit 41.

The supply group 33 is associated with an application member 46, configured for operating on the continuous elongated element 34 radially interposed between the application member itself and the deposition surface "S1", operating in thrust relation towards the deposition surface "S1".

The application member 46 preferably comprises an application roller 47, rotatably idle according to an axis "X1" parallel to a rotation axis "X2" of the pointing wheel 43. The application roller 47 has, in radially external portion, a work surface 48 that is preferably continuous in an axial direction, and is preferably supported by at least one plate 49 in turn coaxially hinged around the rotation axis "X2" of the pointing wheel 43. In the illustrated example, the application surface 48 has a rectilinear cross section profile. In a further preferred embodiment, not illustrated, the application surface 48 has a curvilinear cross section profile. More particularly, the application surface 48 can for example have a convex cross section profile.

The application roller 47 is movable around the pointing wheel 43, upon the action of control devices comprising for example a positioning actuator 50, carrying a rack 51 cooperating with a pinion 52 integral with the plate 49. The positioning actuator 50 drives the movement of the application roller 47, so as to control the positioning thereof around the pointing wheel 43. More particularly, the application member 46 can be selectively translated between a feed position (FIG. 5) in which it defines, with the pointing wheel 43, an inlet opening 53 aligned with a direction of advancement of the continuous elongated element 34 coming from the supply group 33, and a disengagement position (FIG. 7) in which it is angularly shifted with respect to the feed position, e.g. according to an angle approximately comprised between about 160° and 200°. The application member 46 is also selectively positioned in a pointing position (FIG. 6), interposed between the rest position and the disengagement position.

In proximity to the application member 46, guide devices 54 also operate, comprising preferably a transit opening 55 (FIG. 8a) having an axial positioning that is fixed with respect to the application member 46 itself. The transit opening 55, preferably counter-shaped with respect to the cross section profile of the continuous elongated element 34, can for example be defined between the pointing wheel 43 and at least one containment counter-roller 56 arranged to operate tangentially against an external circumferential surface of the pointing wheel 43 itself.

More particularly, the transit opening 55 can be defined by at least one circumferential guide groove 57 defined along a radially external surface of at least one of said pointing wheel 43 and containment counter-roller 56.

Preferably, for example upon command of an auxiliary actuator 58, the containment counter-roller 56 is selectively movable between a rest position in which it is spaced from the pointing wheel 43, and an operative position in which it operates tangentially against the pointing wheel 43 in order to define, together with the latter, the aforesaid transit opening 55.

In the rest condition, the containment counter-roller 56 frees the access for the application member 46 towards the respective feed position.

Hereinbelow, the operating cycle for the deposition devices 31 is described, starting from an end-cycle condition in which the continuous elongated element 34, engaged around the pulley 38 and through the fixed gripper 44a and the movable gripper 44b, terminates at the cutting unit 41, where it is cut at the end of the preceding operating cycle.

Figure 5:
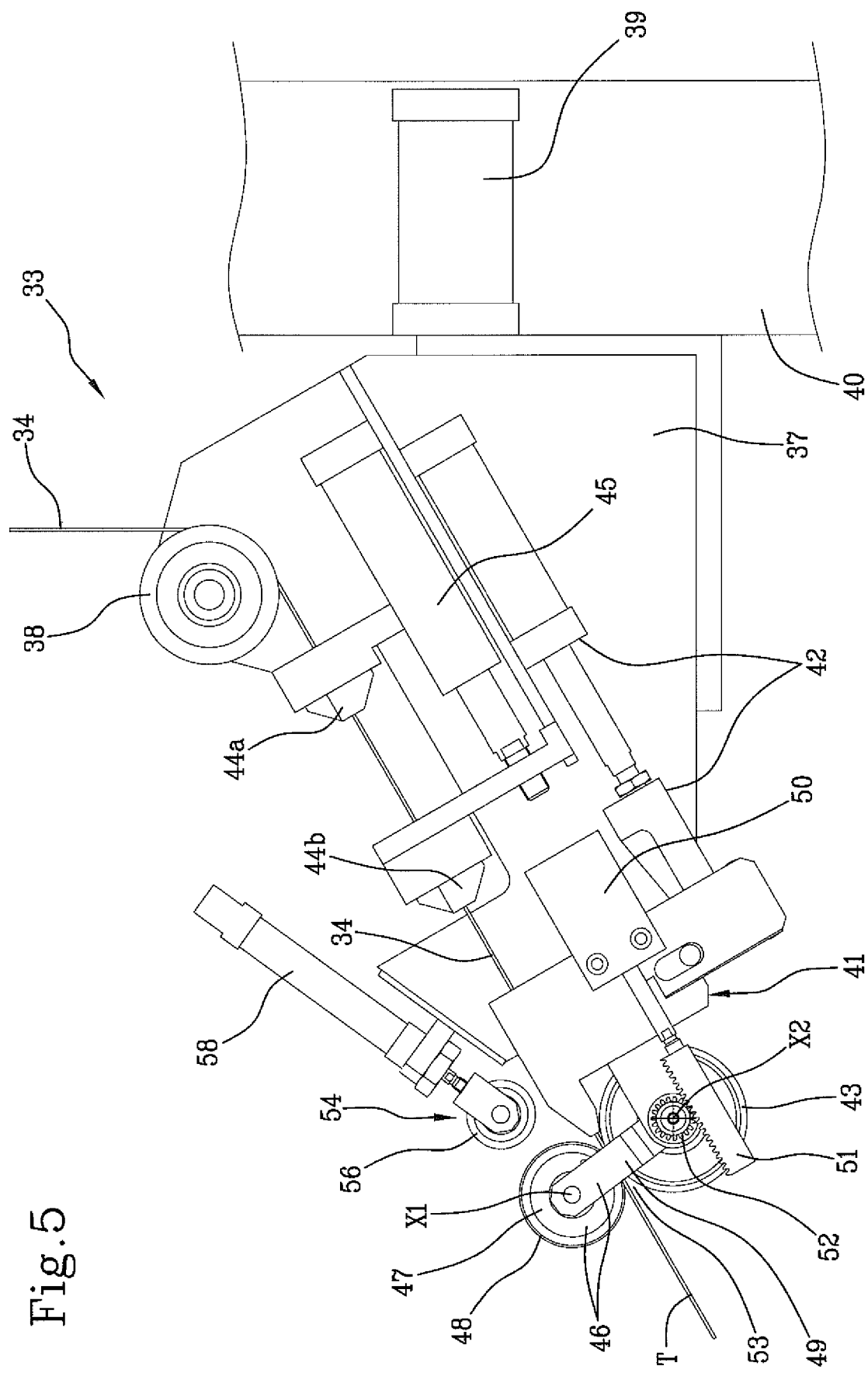
FIG. 5 schematically shows a side view of a supply group constituting part of deposition devices, at the end of an action of feeding the continuous elongated element.
Figure 6:
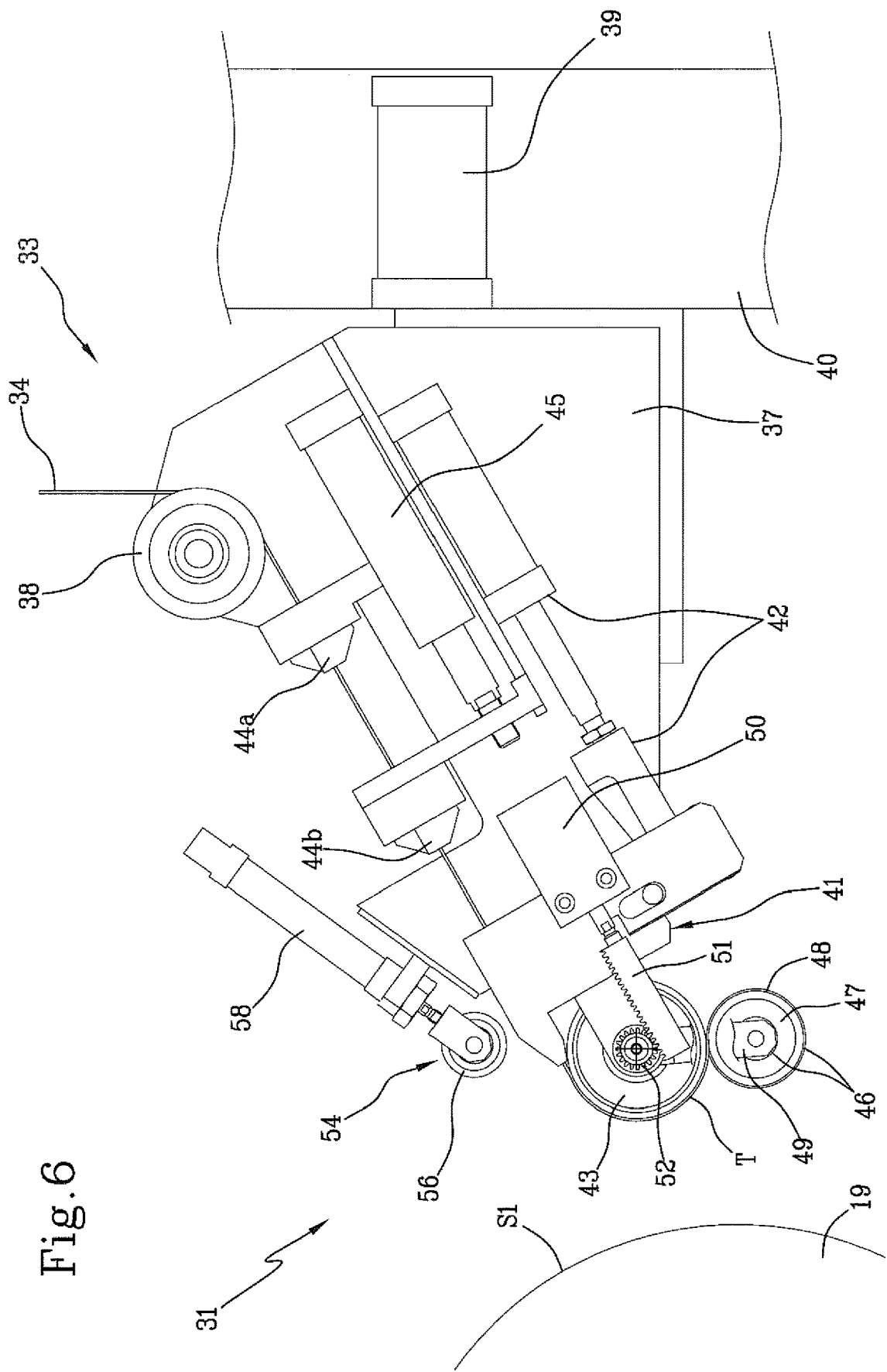
FIG. 6 shows the supply group at the end of an action of bending a terminal section of the continuous elongated element.

With a coordinated driving of the grippers 44a, 44b and of the feeding actuator 45, the continuous elongated element 34 is longitudinally advanced through the cutting unit 41, according to one or more movement steps, until a terminal section "T" thereof is brought to tangentially project according to a predetermined length beyond the pointing wheel 43, through the inlet opening 53 delimited between the pointing wheel 43 and the application roller 47, arranged in the feed position (FIG. 5).

Upon action of the positioning actuator 50, the application roller 47 is translated around the pointing wheel 43 towards the disengagement position. The terminal section "T" of the continuous elongated element 34 is consequently bent according to a curved extension along the circumferential extension of the pointing wheel 43. The angular translation of the application roller 47 is stopped upon reaching the pointing position in which, for example following an angular travel approximately comprised between 150° and 180°, it arrives close to the end of the continuous elongated element 34 (FIG. 6) without however going beyond it. The terminal section "T" of the continuous elongated element 34 is thus retained according to a curved extension around the pointing wheel 43, opposing the elasticity thereof and, above all in the presence of cords 34a of metallic type, tends to make them maintain a substantially rectilinear extension.

In the meantime, or at a subsequent time, the forming drum 19 carrying the shaped carcass sleeve 12 was picked up from the shaping station 14 and suitably positioned in proximity to the pointing wheel 43 upon action of the robotic arm 36, preferably with its geometric rotation axis X-X coplanar with the rotation axis "X1" of the application roller 47.

Upon command of the thrust actuator 39, the supply group 33 is moved towards the forming drum 19. The pointing wheel 43 is consequently thrust towards the forming drum 19 so as to bring the terminal section "T" in thrust relation against the deposition surface "S1". The stickiness of the raw elastomeric material that covers the carcass sleeve 12 and the continuous elongated element 34 determines the stable adhesion of the latter on the deposition surface "S1", in the zone of mutual contact.

With a new action of the positioning actuator 50, the application roller 47 is brought into the disengagement position (FIG. 7), beyond the end of the continuous elongated element 34 so as to free the terminal section "T" thereof, disengaging it from the pointing wheel 43. The terminal section "T", due to elastic effect, in fact tends to assume a rectilinear orientation, being separated from the pointing wheel 43.

Figure 7:
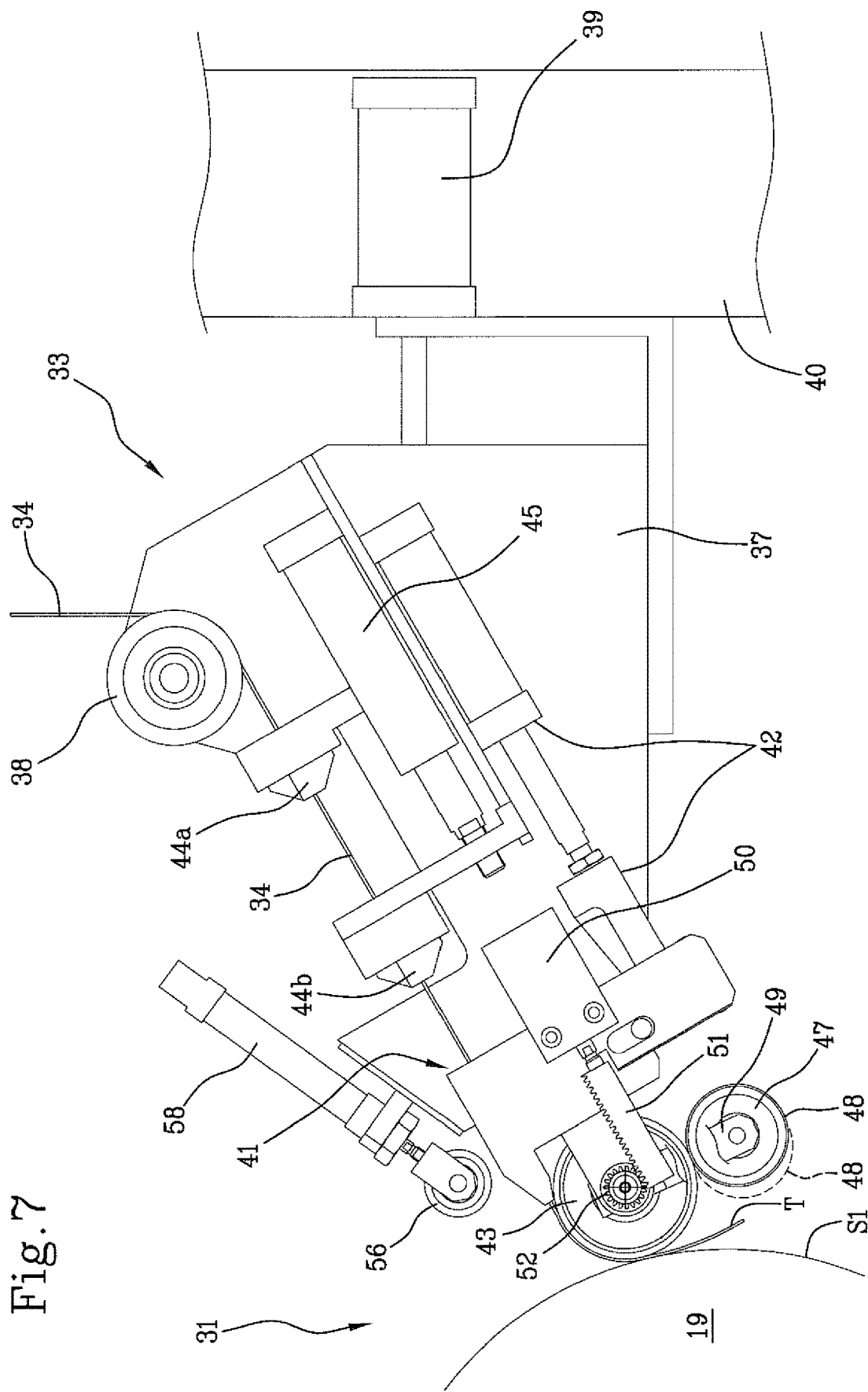
FIG. 7 shows said terminal section disengaged from the pointing wheel at the end of a pointing action of the continuous elongated element against the deposition surface.

Preferably, a short angular rotation of the forming drum 19 around its geometric axis, in anticlockwise sense with respect to FIG. 7, ensures that the pointing wheel 43 thrust towards the deposit surface travels along the terminal section "T" up to the end thereof, causing its stable adhesion on the deposit surface for the entire length.

With the above-described pointing action, the end section of the continuous elongated element 34 is therefore stably positioned on the deposition surface "S1", before starting a winding action of the continuous elongated element 34 according to multiple circumferential coils "C".

For such purpose, the pointing wheel 43 is moved away from the deposition surface "S1", preferably according to a distance less than the diameter of the application roller 47, by means of a retreating supply group 33 upon command of the thrust actuator 39.

The positioning actuator 50 is once again moved in order to translate the application roller 47 from the disengagement position towards the feed position. During this translation, the application roller 47 encounters the deposition surface "S1" and/or the terminal section "T" of the continuous elongated element 34 applied thereon, and it is therefore stopped in a work condition in which it operates in thrust relation towards the deposition surface "S1" itself (FIG. 8).

Figures 8, 8A:
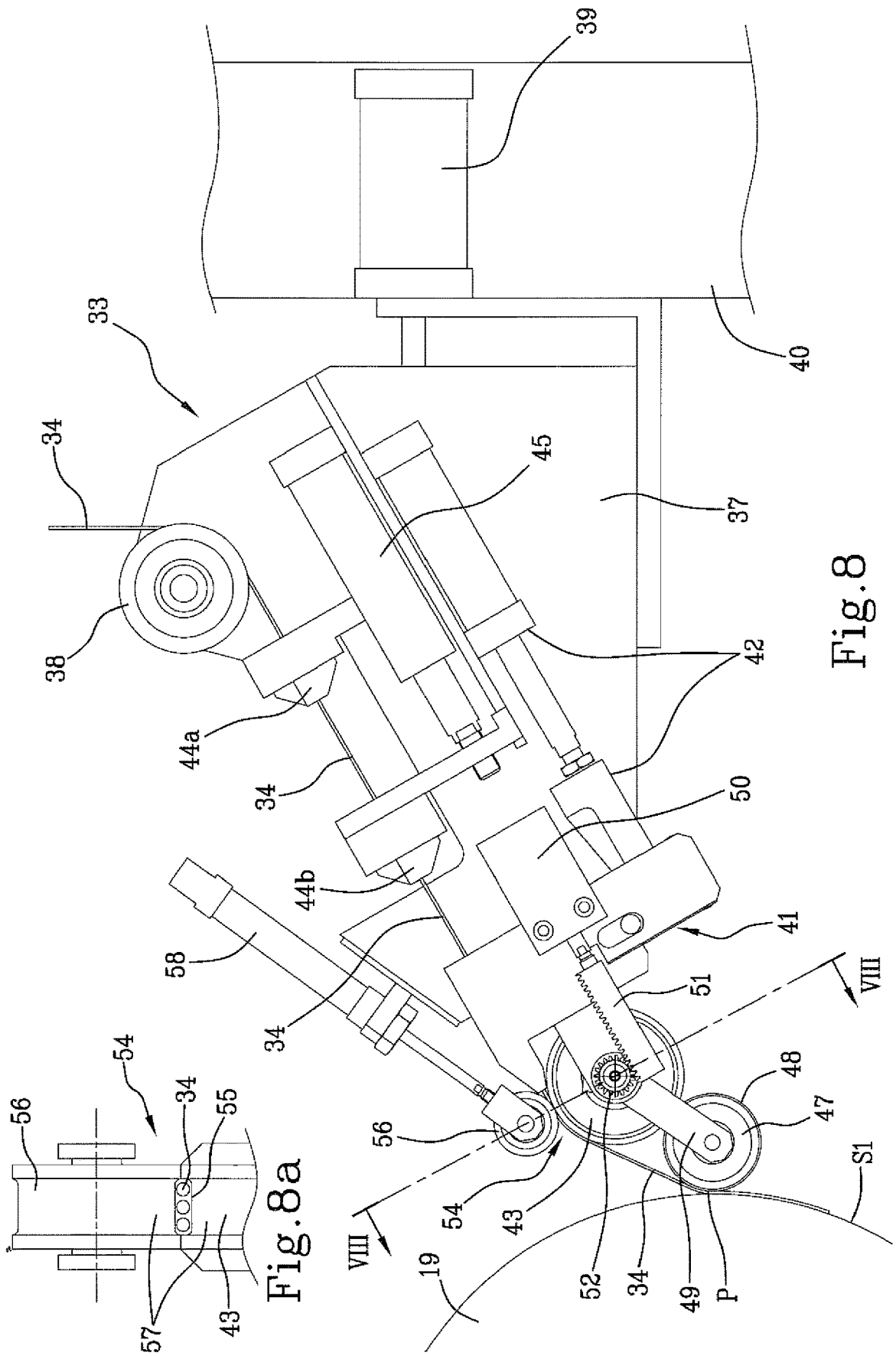
FIG. 8 shows the supply group during winding of the continuous elongated element.
FIG. 8a shows a detail section along the line VIII-VIII of FIG. 8, in enlarged scale.

The robotic arm 36 then drives the forming drum 19 in rotation around its geometric axis X-X, in clockwise sense with respect to FIG. 8, initiating the winding of the continuous elongated element 34 on the deposition surface "S1". The rotation of the forming drum 19 determines a driving of the continuous elongated element 34 through the supply group 33. The continuous elongated element 34 therefore travels along the supply group 33 until it reaches the pointing wheel 43 at the transit opening 55 counter-shaped thereto, delimited between the pointing wheel itself and the containment counter-roller 56 which, in the meantime, has been brought into the operative position upon command of the auxiliary actuator 58.

The continuous elongated element 34 is thus suitably guided towards a point of application "P" defined between the deposition surface "S1" and the work surface 48 of the application roller 47 in the work condition, so as to prevent uncontrolled axial movements thereof with respect to the application roller 47 itself. A suitable control is therefore maintained of the axial positioning of the continuous elongated element 34 on the application roller 47, as well as with respect to the point of application "P".

Simultaneously, the robotic arm 52 provides to suitably move the forming drum 19 in front of the deposition devices 31, if necessary by moving it along its geometric rotation axis X-X, so that the coils "C" circumferentially formed by the continuous elongated element 34 are distributed axially side-by-side, at a desired distance from each other and preferably without mutual contact and/or superimposition, along the transverse extension profile of the deposition surface "S1".

The robotic arm 36 also executes an action of control of the mutual orientation between the forming drum 19 and the application roller 47, e.g. by orienting the forming drum 19 around at least one axis belonging to a plane orthogonal to the geometric rotation axis X-X, such that the application roller 47 maintains its rotation axis X1, and hence the work surface 48, according to an orientation parallel to a direction tangent to the deposition surface "S1", at the point of application "P" of the continuous elongated element 34. It is thus ensured that the thrust action exerted by the application roller 47 in the work condition is constantly oriented according to a direction substantially perpendicular to the deposition surface "S1" at the point of application "P", even when the latter has a transverse profile with accentuated curvature, which can be typically encountered in the processing of tyres for two-wheel vehicles.

The axial size "d" of the work surface 48 of the application member 46 can be advantageously pre-established as a function of the maximum coiling pitch "p", i.e. the maximum interaxis existing between two respectively contiguous coils "C". More particularly, provision is preferably made such that the work surface 48 of the application member 46 advantageously has an axial size "d" greater than the coiling pitch "p". In addition or alternatively, the axial size "d" of the work surface 48 can be at least greater than the distance "p1" existing between two contiguous coils "C" formed by the continuous elongated element 34 wound around the deposition surface "S1".

Such distance "p1", not necessarily constant, has a size less than that of the coiling pitch "p", especially when a continuous elongated element 34 is used comprising multiple mutually approached cords 34a, as in the illustrated case.

More particularly, the axial size "d" of the work surface 48 is preferably equal to at least three times the axial size "d" of the continuous elongated element 34 applied on the deposition surface "S1". In one embodiment provided by way of example, the axial size "d" of the work surface 48 is greater than 25 mm.

Preferably, the axial size "d" of the work surface 48 is also greater than the axial size "d1" of the pointing wheel 43.

Consequently, during the formation of at least one part of the belt layer 7a or another reinforcement annular structure, the application member 46 is constantly radially superimposed with respect to at least one of the coils "C" previously formed by the continuous elongated element 34. More particularly, the application member 48 can operate constantly in abutment against one or more of the coils "C" during the formation of the entire belt layer 7a, except for the first coil "C" created at the start of the winding operation. Alternatively, the application surface 48, e.g. due to its possible convexity and/or the curved transverse profile of the forming drum 19, can normally remain slightly spaced from the previously-formed coil "C", in order to abut against the same only following a radial movement of the application roller 37 towards the forming drum 19. In particular, such radial movement can manifest itself when the application roller 37 and/or of the continuous elongated element 34 at the deposition point "P" encounter one of the cavities 28 below them, and they tend to penetrate therein due to the thrust exerted by the application roller 37.

The action of abutment of the application roller 47 against at least one of the previously-laid coils "C" prevents the discontinuities induced on the deposition surface "S1"—due to the underlying cavities 28 alternated with the solid portions 29—from transmitting undesired impact and vibrations to the application roller 47, compromising the regularity of the processing. Indeed, at each moment in which the point of application "P" is situated above one of the cavities 28, the previously-laid coil "C" can effectively oppose the thrust action exerted by the application roller 47 due to the rigid support offered by the underlying solid portion 29 of the abutment surface "S".

In the presence of cavities 28, each having axial size "n" greater than the distance "p1" existing between two axially contiguous coils "C", it may also occur that the previously-laid coil "C" does not find support on one of the solid portions 29. Even in this case, however, a suitable support will be ensured to the application roller 47. It is in fact observed that the continuous elongated element 34 wound around the deposition surface "S1", in the sections supported between two circumferentially contiguous solid portions 29 of the abutment surface, behaves substantially like a beam that bridges between two supports, which resists the inward bending of the underlying cavity 28, offering an effective opposition to the thrust action exerted by the application member 46.

The use of a work surface 48 having axial size "d" greater than the axial size "d" of the cavities 28 provides, if necessary, a further assurance of an effective support action, even during the creation of the first coil "C" at the start of the formation of the belt layer 7a. Indeed, at least one part of the work surface 48 is adapted to operate in contact with the deposition surface "S1" at one of the solid portions 29, so as to prevent an excessive "sinking" of the continuous elongated element 34 inside the cavities 28. Such "sinking" in fact cannot be greater than the thickness of the continuous elongated element, measured radially with respect to the geometric rotation axis X-X.

Figure 10:
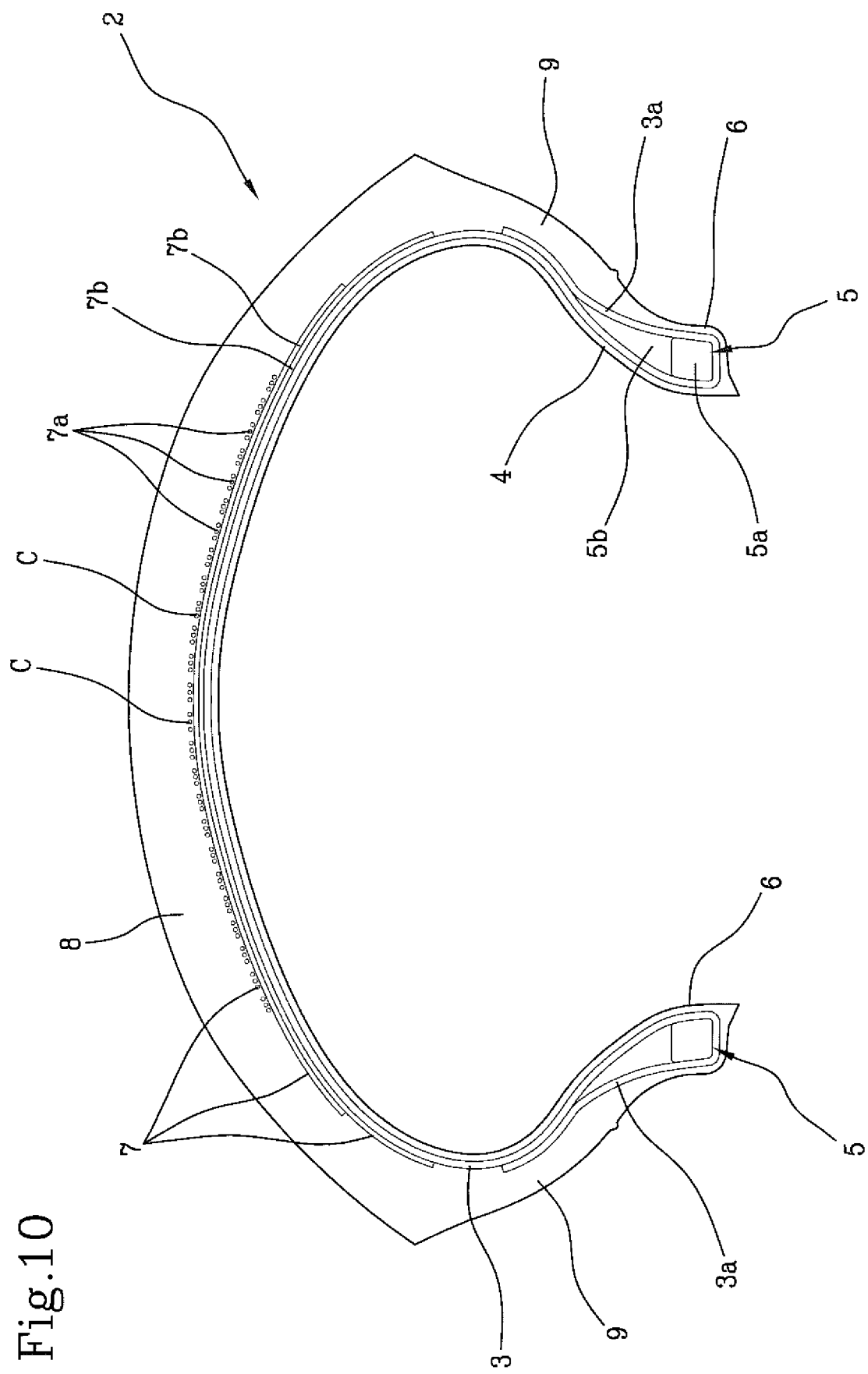
FIG. 10 schematically shows, in radial half-section, a tyre that can be made in accordance with the present invention.

The belt structure application station 32 can if necessary comprise devices 59 for building one or more auxiliary layers 7b, indicated in the embodiment of FIG. 10, to be applied on the shaped carcass sleeve 12, before or after the application of said at least one belt layer 7a. In particular, such auxiliary layers 7b can comprise metallic or textile parallel cords, arranged according to an orientation that is tilted with respect to the circumferential extension direction of the carcass sleeve 12, respectively crossed between auxiliary layers 7b that are adjacent to each other.

By means of the robotic arm 36, or by means of a second anthropomorphic robotic arm or handling device of another type, the forming drum 19 can then be transferred from the belt structure application station 32 to a tread band application station 60, preferably constituting part of a green tyre completion line integrating the same belt structure application station 32.

In the tread band application station 60, an auxiliary coiling unit 61 can for example operate which is configured for winding, in radially external position around the belt structure 7, at least one elementary semifinished product in the form of a continuous elongated element made of elastomeric material, lacking reinforcement cords, according to axially approached circumferential coils in mutual contact, while the forming drum 19 is rotated and suitably moved, for example by the same robotic arm 36, in order to distribute the circumferential coils according to a predefined scheme. The plant 1 can also comprise devices for making sidewalls (not illustrated) against axially opposed lateral portions of the carcass sleeve 12, which can operate in a manner analogous to the auxiliary coiling unit 61.

The built green tyre 2 is adapted to be removed from the forming drum 23 in order to then be vulcanised in a vulcanisation unit 62.

The invention claimed is:

1. A process for building a tyre for vehicle wheels, comprising forming at least one reinforcement annular structure of a tyre being processed by:
arranging a forming drum externally carrying a deposition surface, wherein the forming drum has cavities alternated with solid portions at the deposition surface;
arranging an application member supported in thrust relation toward the deposition surface;
longitudinally guiding a continuous elongated element toward a point of application between the deposition surface and a work surface presented by the application member; and
winding the continuous elongated element circumferentially around the deposition surface in order to form circumferential coils that are axially side-by-side each other,
wherein, during winding, the work surface of the application member is configured for operating in abutment relation against at least one of the coils previously formed by the continuous elongated element during the forming of at least one part of the reinforcement annular structure,
wherein the cavities each have an axial size greater than an interaxis existing between two axially contiguous coils formed by the continuous elongated element, and
wherein the work surface of the application member has an axial size greater than the axial size of the cavities.

2. The process as claimed in claim 1, wherein the work surface of the application member has an axial size greater than an interaxis existing between two axially contiguous coils.

3. The process as claimed in claim 1, wherein the application member operates on the continuous elongated element radially interposed between the application member and the deposition surface.

4. The process as claimed in claim 1, wherein the continuous elongated element wound around the deposition surface at least partially opposes a thrust action exerted by the application member at at least one of the cavities.

5. The process as claimed in claim 1, wherein the work surface of the application member is substantially continuous in an axial direction.

6. The process as claimed in claim 1, wherein winding said continuous elongated element comprises:
rotating the forming drum around a geometric rotation axis thereof, in order to cause the winding of the continuous elongated element according to circumferential coils; and
actuating controlled relative movements between the forming drum and the application member during the rotation of the forming drum in order to distribute the coils in a mutually axially approached relationship.

7. The process as claimed in claim 1, wherein said deposition surface comprises at least one carcass externally applied to the forming drum.

8. The process as claimed in claim 1, wherein, during winding, the work surface of the application member is maintained substantially parallel to the deposition surface of the forming drum at the point of application.

9. The process as claimed in claim 8, wherein the work surface of the application member is maintained substantially parallel to the deposition surface of the forming drum by an action of control of a mutual orientation between the forming drum and the application member.

10. The process as claimed in claim 1, further comprising performing a pointing action for positioning a terminal section of the continuous elongated element on the deposition surface, before starting the winding action.

11. The process as claimed in claim 10, wherein the pointing action is followed by:
moving a pointing wheel away from the forming drum; and
positioning the application member against the continuous elongated element at said point of application.

12. The process as claimed in claim 10, wherein the pointing action comprises:
longitudinally moving the continuous elongated element until the terminal section thereof is brought to tangentially project beyond a pointing wheel;
bending the terminal section according to a curved extension around the pointing wheel;
moving the pointing wheel toward the forming drum in order to bring said terminal section in thrust relation against the deposition surface; and
disengaging the terminal section from the pointing wheel.

13. The process as claimed in claim 12, wherein during said longitudinal movement, the terminal section of the continuous elongated element is inserted between the application member and the pointing wheel.

14. The process as claimed in claim 12, wherein the disengagement of the terminal section from the pointing wheel occurs by angularly moving the application member beyond the terminal section.

15. The process as claimed in claim 12, wherein bending the terminal section is executed by translating the application member according to a curved path around the pointing wheel.

16. The process as claimed in claim 12, wherein the moving of the pointing wheel away from the forming drum occurs at a distance less than the diameter of an application roller.

17. The process as claimed in claim 1, wherein said application member comprises an application roller rotatable according to a rotation axis substantially coplanar with a geometric rotation axis of the forming drum.

18. The process as claimed in claim 17, wherein, during winding, the rotation axis of the application roller is maintained substantially parallel to a direction tangent to the deposition surface at the point of application of the continuous elongated element.

19. The process as claimed in claim 17, wherein by control of a mutual orientation between the forming drum and the application roller, the rotation axis of the application roller is maintained substantially parallel to a direction tangent to the deposition surface at the point of application of the continuous elongated element.

20. The process as claimed in claim 17, wherein, during winding, the application roller is rotated by the continuous elongated element applied on the deposition surface.

21. The process as claimed in claim 1, further comprising applying a carcass sleeve around the forming drum, before the deposition of the continuous elongated element.

22. The process as claimed in claim 21, wherein applying the carcass sleeve comprises:
arranging the carcass sleeve around the forming drum arranged in a radially contracted condition; and
expanding the forming drum inside the carcass sleeve during a shaping action thereof according to a toroidal configuration.

23. An apparatus for building a tyre for vehicle wheels, comprising:
a forming drum counter-shaped with respect to a tyre being processed, wherein the forming drum is externally carrying a deposition surface and wherein the forming drum has cavities alternated with solid portions at the deposition surface;
deposition devices for forming at least one reinforcement annular structure of said tyre, wherein said deposition devices comprise;
an application member configured for operating in thrust relation toward said deposition surface; and
a supply group for supplying at least one continuous elongated element toward a point of application between the deposition surface and a work surface presented by the application member; and
a coiling unit for winding the continuous elongated element circumferentially around the deposition surface of the forming drum, to form circumferential coils that are axially side-by-side each other,
wherein the work surface of the application member has an axial size greater than the distance existing between two contiguous coils formed by the continuous elongated element wound around the deposition surface,
wherein the cavities each have an axial size greater than an interaxis existing between two axially contiguous coils formed by the continuous elongated element, and
wherein the work surface of the application member has an axial size greater than the axial size of the cavities.

24. The apparatus as claimed in claim 23, wherein said coiling unit comprises devices for rotating the forming drum around a geometric axis thereof and conferring relative axial distribution movements between the forming drum and the supply group.

25. The apparatus as claimed in claim 23, wherein the work surface of the application member has an axial size at least equal to three times the axial size of the continuous elongated element applied on the deposition surface.

26. The apparatus as claimed in claim 23, wherein the work surface of the application member has an axial size greater than 10 mm.

27. The apparatus as claimed in claim 23, wherein said application member comprises an application roller that is rotatable according to a rotation axis substantially coplanar with a geometric rotation axis of the forming drum.

28. The apparatus as claimed in claim 23, wherein said coiling devices comprise an anthropomorphic robotic arm.

29. The apparatus as claimed in claim 23, wherein the application member is movable around a pointing wheel rotatably carried by a support structure.

30. The apparatus as claimed in claim 29, further comprising thrust devices operating between said support structure and a fixed structure.

31. The apparatus as claimed in claim 29, further comprising control devices operating on the application member in order to selectively translate the application member between a feed position in which the application member defines, with said pointing wheel, an inlet opening aligned with a direction of advancement of the continuous elongated element coming from the supply group, and a disengagement position in which it is angularly shifted with respect to the feed position.

32. The apparatus as claimed in claim 31, wherein, in the disengagement position, the application member is angularly shifted with respect to the feed position according to an angle between 160° and 200°.

33. The apparatus as claimed in claim 31, wherein said control devices further translate the application member into a pointing position interposed between the feed position and the disengagement position.

34. The apparatus as claimed in claim 31, wherein said control devices further translate the application member into at least one work condition in which the application member operates between the feed position and the disengagement position, in thrust relation toward the deposition surface.

35. The apparatus as claimed in claim 23, further comprising guide devices operating in proximity to the application member for controlling the axial positioning of the continuous elongated element with respect to the application point.

36. The apparatus as claimed in claim 35, wherein said guide devices comprise a transit opening having an axial positioning that is fixed with respect to the application member.

37. The apparatus as claimed in claim 36, wherein said transit opening is counter-shaped with respect to a cross section profile of the continuous elongated element.

38. The apparatus as claimed in claim 36, wherein said transit opening is defined between a pointing wheel and a containment counter-roller operating tangentially against an external circumferential surface of the pointing wheel.

39. The apparatus as claimed in claim 38, wherein said transit opening is defined by at least one circumferential guide groove defined along a radially external surface of at least one of said pointing wheel and containment counter-roller.

40. The apparatus as claimed in claim 38, wherein the pointing wheel is movable toward the forming drum in order to bring the continuous elongated element against the deposition surface.

41. The apparatus as claimed in claim 38, wherein the containment counter-roller is selectively translatable between an operative position in which said counter-roller operates against the pointing wheel and a rest position in which said counter-roller is moved away from the pointing wheel.

42. The apparatus as claimed in claim 41, wherein, in the rest condition, the containment counter-roller frees an access for the application member toward the respective feed position.

43. A process for building a tyre for vehicle wheels, comprising forming at least one reinforcement annular structure of a tyre being processed by:
- arranging a forming drum externally carrying a deposition surface, wherein the forming drum has cavities alternated with solid portions at the deposition surface;
- arranging an application member supported in thrust relation toward the deposition surface;
- longitudinally guiding a continuous elongated element toward a point of application between the deposition surface and a work surface presented by the application member; and
- winding the continuous elongated element circumferentially around the deposition surface in order to form circumferential coils that are axially side-by-side each other,
- wherein a pointing action for positioning a terminal section of the continuous elongated element on the deposition surface is performed before starting the winding action, wherein the pointing action comprises:
  - longitudinally moving the continuous elongated element until the terminal section thereof is brought to tangentially project beyond a pointing wheel;
  - bending the terminal section according to a curved extension around the pointing wheel;
  - moving the pointing wheel toward the forming drum in order to bring said terminal section in thrust relation against the deposition surface; and
  - disengaging the terminal section from the pointing wheel by angularly moving the application member beyond the terminal section; and
- wherein, during winding, the work surface of the application member is configured for operating in abutment relation against at least one of the coils previously formed by the continuous elongated element during the forming of at least one part of the reinforcement annular structure.

44. The process as claimed in claim 43, wherein the work surface of the application member has an axial size greater than the axial size of the cavities.

45. The process as claimed in claim 43,
- wherein the forming drum has cavities alternated with solid portions at the deposition surface, and
- wherein the cavities each have an axial size greater than an interaxis existing between two axially contiguous coils formed by the continuous elongated element.

46. A process for building a tyre for vehicle wheels, comprising forming at least one reinforcement annular structure of a tyre being processed by:
- arranging a forming drum externally carrying a deposition surface, wherein the forming drum has cavities alternated with solid portions at the deposition surface;
- arranging an application member supported in thrust relation toward the deposition surface;
  - longitudinally guiding a continuous elongated element toward a point of application between the deposition surface and a work surface presented by the application member; and
- winding the continuous elongated element circumferentially around the deposition surface in order to form circumferential coils that are axially side-by-side each other,
- wherein a pointing action for positioning a terminal section of the continuous elongated element on the deposition surface is performed before starting the winding action, wherein the pointing action comprises:
  - longitudinally moving the continuous elongated element until the terminal section thereof is brought to tangentially project beyond a pointing wheel;
  - bending the terminal section according to a curved extension around the pointing wheel by translating the application member according to a curved path around the pointing wheel;
  - moving the pointing wheel toward the forming drum in order to bring said terminal section in thrust relation against the deposition surface; and
  - disengaging the terminal section from the pointing wheel; and
- wherein, during winding, the work surface of the application member is configured for operating in abutment relation against at least one of the coils previously formed by the continuous elongated element during the forming of at least one part of the reinforcement annular structure.

47. The process as claimed in claim 46, wherein the work surface of the application member has an axial size greater than the axial size of the cavities.

48. The process as claimed in claim 46,
- wherein the forming drum has cavities alternated with solid portions at the deposition surface, and
- wherein the cavities each have an axial size greater than an interaxis existing between two axially contiguous coils formed by the continuous elongated element.

* * * * *